(12) United States Patent
Lee et al.

(10) Patent No.: US 11,200,648 B2
(45) Date of Patent: Dec. 14, 2021

(54) METHOD AND APPARATUS FOR ENHANCING ILLUMINATION INTENSITY OF IMAGE

(71) Applicant: LG ELECTRONICS INC., Seoul (KR)

(72) Inventors: Woonchae Lee, Seoul (KR); Wonsu Choi, Gwangmyeong-si (KR); Seonhui Sunny Kim, Seoul (KR); Minho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 16/783,084

(22) Filed: Feb. 5, 2020

(65) Prior Publication Data

US 2021/0133938 A1    May 6, 2021

(30) Foreign Application Priority Data

Nov. 4, 2019  (KR) .................. 10-2019-0139562

(51) Int. Cl.
| | |
|---|---|
| *G06T 5/00* | (2006.01) |
| *G06T 3/40* | (2006.01) |
| *G06N 3/04* | (2006.01) |
| *G06N 20/20* | (2019.01) |
| *G06N 3/08* | (2006.01) |

(52) U.S. Cl.
CPC ........... *G06T 5/009* (2013.01); *G06N 3/0454* (2013.01); *G06N 3/08* (2013.01); *G06N 20/20* (2019.01); *G06T 3/40* (2013.01); *G06T 5/002* (2013.01); *G06T 5/003* (2013.01);

(Continued)

(58) Field of Classification Search
None
See application file for complete search history.

(56) References Cited

U.S. PATENT DOCUMENTS

2008/0302975 A1* 12/2008 Kimura ............... G01N 21/648
                                                                 250/458.1
2013/0329998 A1* 12/2013 Webb .................... G06T 5/40
                                                                 382/167

(Continued)

FOREIGN PATENT DOCUMENTS

| CN | 109086886 A | * 12/2018 |
|---|---|---|
| CN | 109636754 A | * 4/2019 |

*Primary Examiner* — Jiangeng Sun
(74) *Attorney, Agent, or Firm* — Lee Hong Degerman Kang & Waimey

(57) ABSTRACT

A method for enhancing illumination intensity of an image according to an embodiment of the present disclosure may include receiving an image, determining a filter application scheme by using a neural network model trained to enhance the illumination intensity of the image, and outputting an image having enhanced illumination intensity by applying, to the image, the determined filter application scheme. The neural network model trained using machine learning includes a first group of layers for extracting feature information of the image, a second group of layers for determining a type of filter based on the extracted feature information, and a third group of layers for determining the optimal parameter for the filter based on the extracted feature information. The neural network model may be provided through an external server in an IoT environment using a 5G network.

20 Claims, 9 Drawing Sheets

(52) U.S. Cl.
CPC ............... *G06T 2207/20024* (2013.01); *G06T 2207/20081* (2013.01); *G06T 2207/20084* (2013.01)

(56) References Cited

U.S. PATENT DOCUMENTS

| | | | |
|---|---|---|---|
| 2017/0124928 A1* | 5/2017 | Edwin | G06T 15/20 |
| 2019/0045163 A1* | 2/2019 | Nikkanen | H04N 9/735 |
| 2020/0286208 A1* | 9/2020 | Halupka | G06N 3/0472 |
| 2021/0150675 A1* | 5/2021 | Halupka | G06N 3/0454 |

* cited by examiner

【FIG. 1】
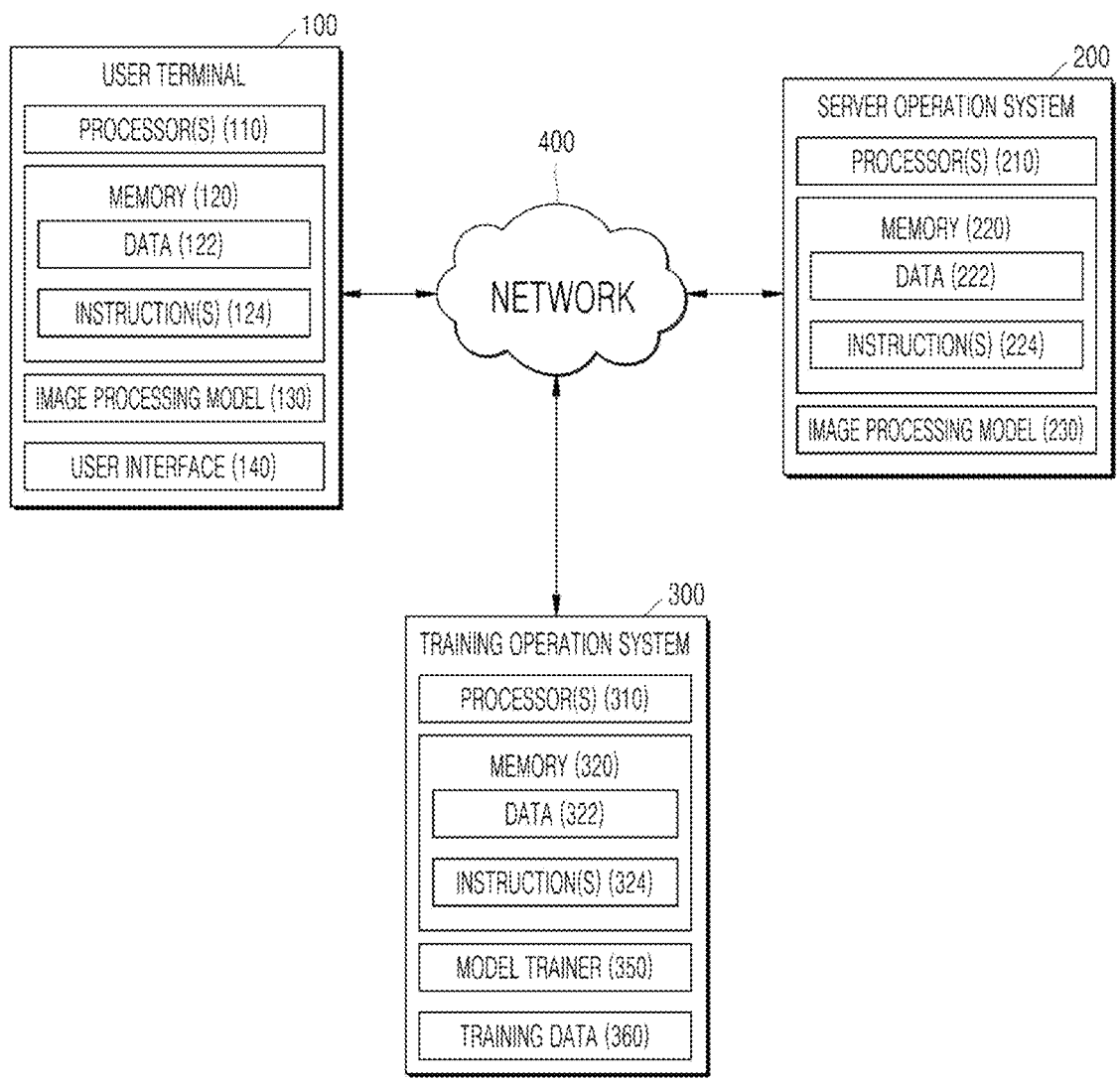

[FIG. 2]
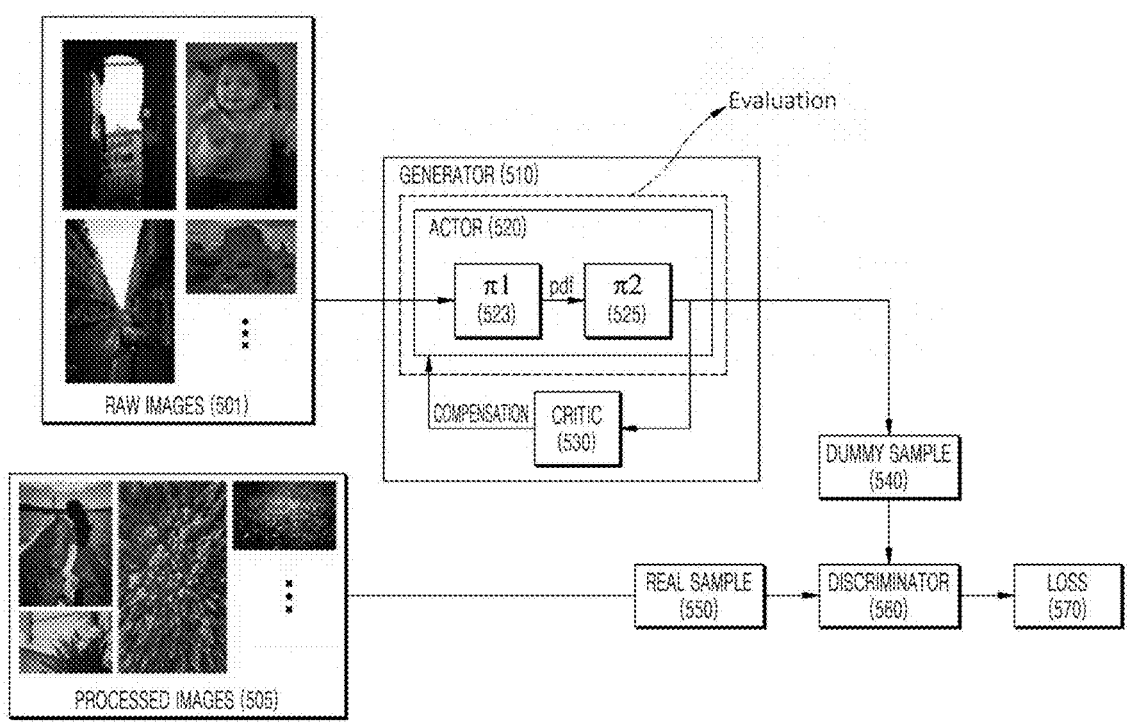

[FIG. 3]
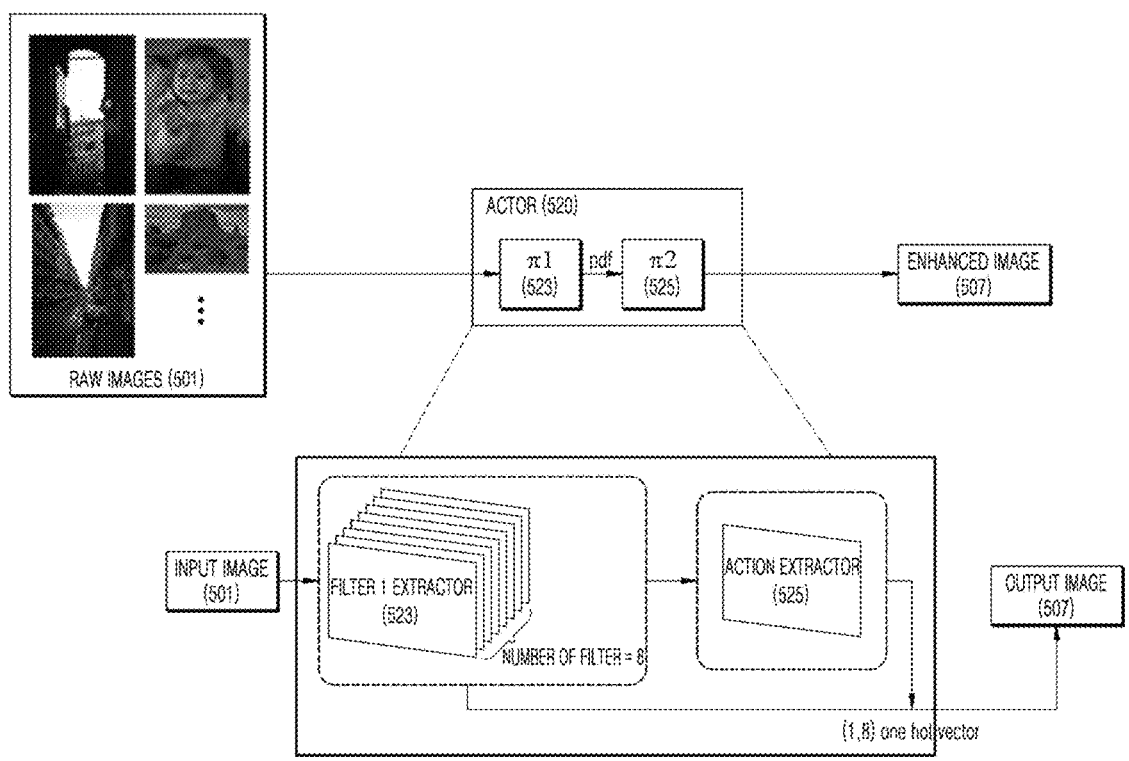

[FIG. 4]
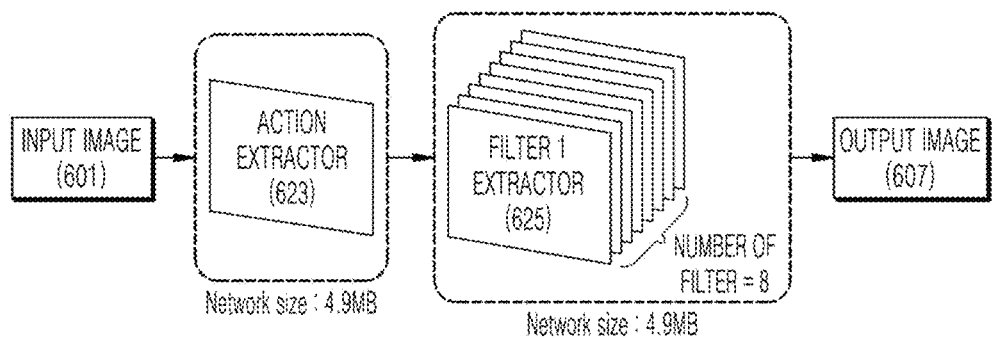
[FIG. 5]
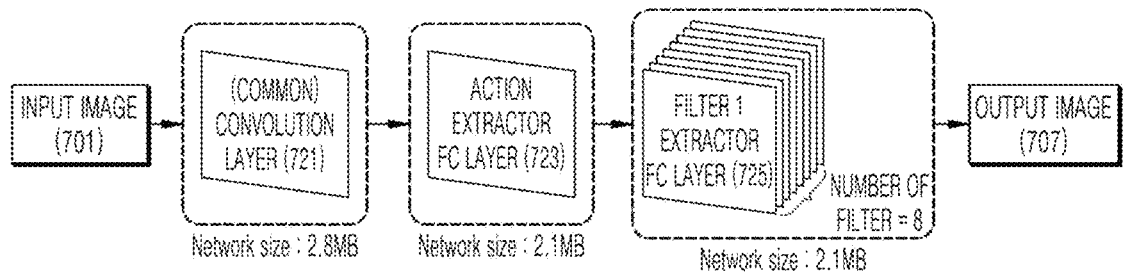

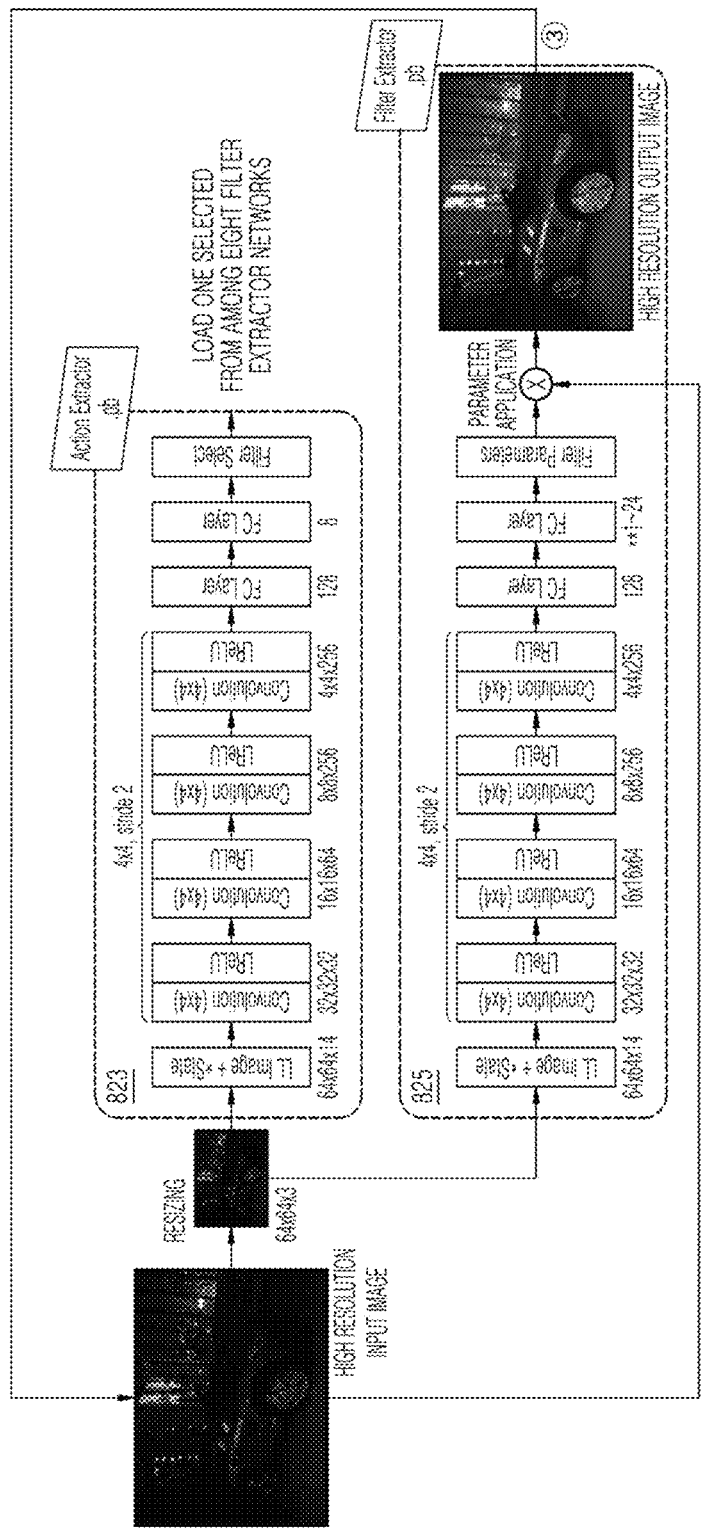
[FIG. 6]

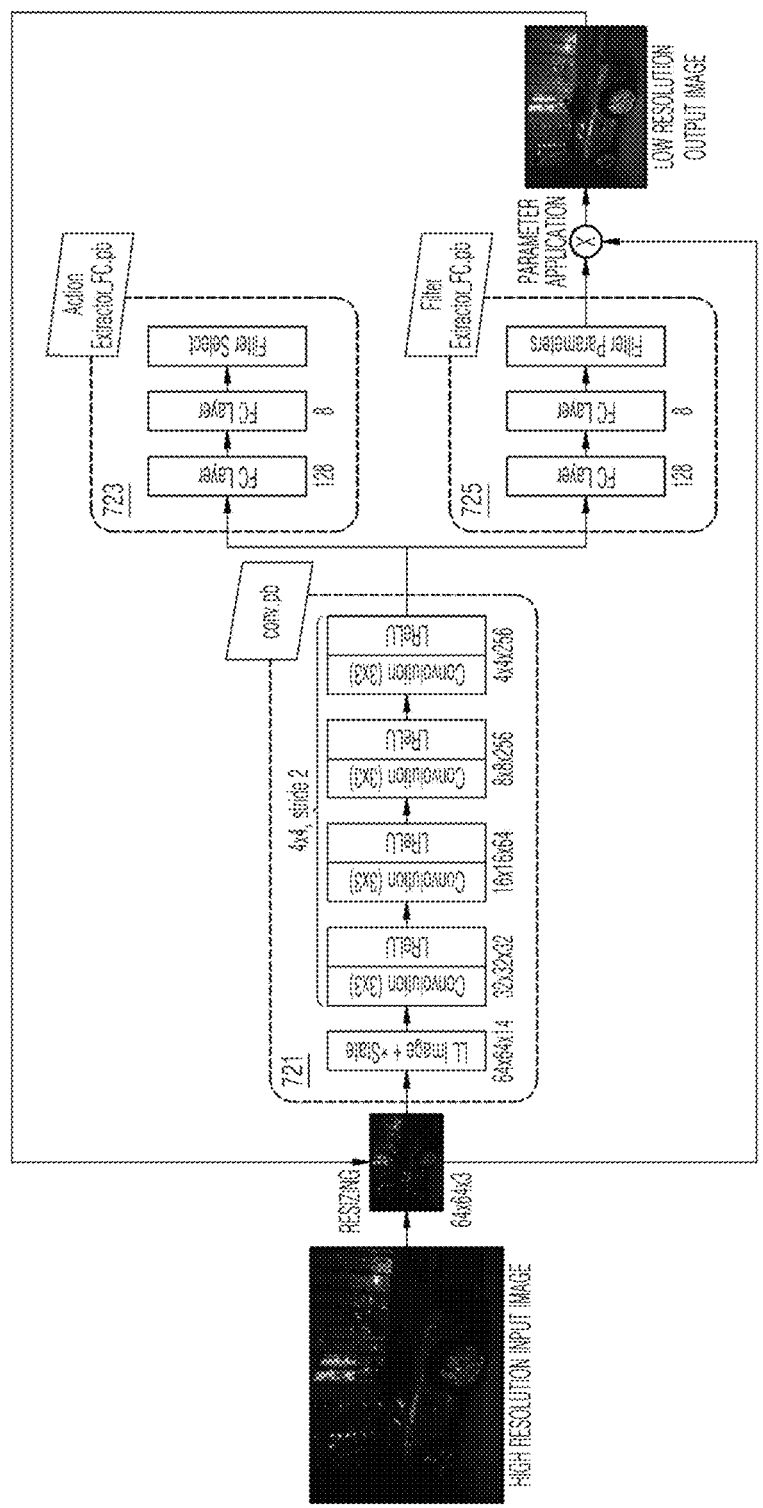
[FIG. 7]

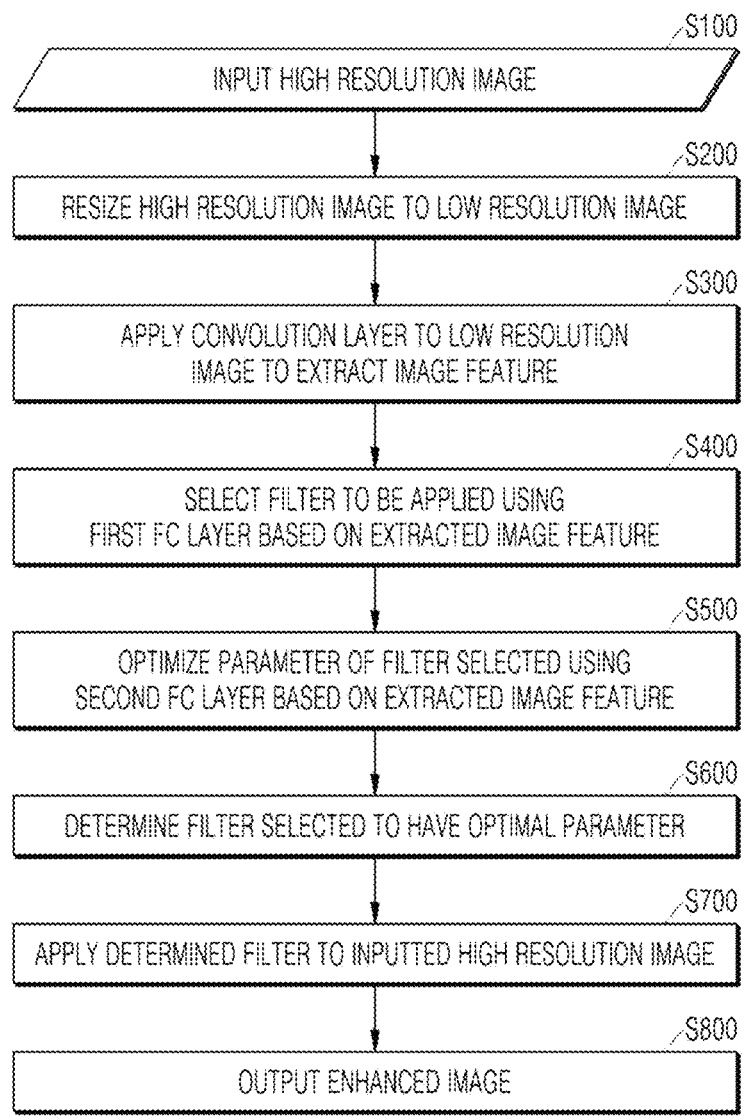

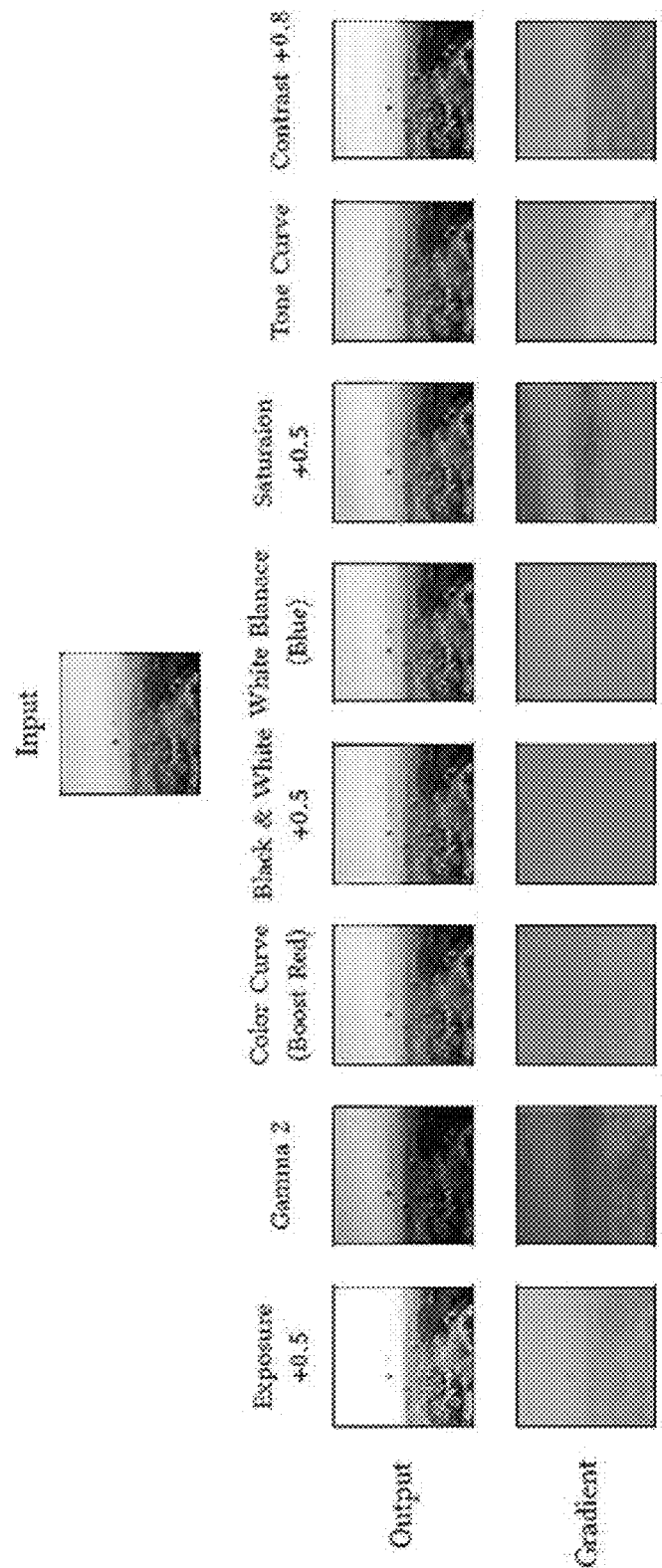
[FIG. 9]

【FIG. 10】

| WHEN CONVOLUTION FILED IS NOT SHARED | Network Size (MB) | WHEN CONVOLUTION FILED IS SHARED | Network Size (MB) |
|---|---|---|---|
| - | - | exposure_conv_snpe.dlc | 2.8 |
| action_selection_snpe.dlc | 4.9 | action_selection_fc_snpe.dlc | 2.1 |
| filter_0_snpe.dlc | 4.9 | filter_0_fc_snpe.dlc | 2.1 |
| filter_1_snpe.dlc | 4.9 | filter_1_fc_snpe.dlc | 2.1 |
| filter_2_snpe.dlc | 4.9 | filter_2_fc_snpe.dlc | 2.1 |
| filter_3_snpe.dlc | 4.9 | filter_3_fc_snpe.dlc | 2.1 |
| filter_4_snpe.dlc | 4.9 | filter_4_fc_snpe.dlc | 2.1 |
| filter_5_snpe.dlc | 4.9 | filter_5_fc_snpe.dlc | 2.1 |
| filter_6_snpe.dlc | 4.9 | filter_6_fc_snpe.dlc | 2.1 |
| filter_7_snpe.dlc | 4.9 | filter_7_fc_snpe.dlc | 2.1 |
| Total | 44.1 | Total | 21.7 |

【FIG. 11】

| WHEN CONVOLUTION FILED IS NOT SHARED | Network loading time (ms) | WHEN CONVOLUTION FILED IS SHARED | Network loading time (ms) |
|---|---|---|---|
| - | - | exposure_conv_snpe.dlc | 446 |
| action_selection_snpe.dlc | 384 | action_selection_fc_snpe.dlc | 409 |
| filter_0_snpe.dlc | 411 | filter_0_fc_snpe.dlc | 421 |
| filter_1_snpe.dlc | 459 | filter_1_fc_snpe.dlc | 411 |
| filter_2_snpe.dlc | 412 | filter_2_fc_snpe.dlc | 514 |
| filter_3_snpe.dlc | 525 | filter_3_fc_snpe.dlc | 364 |
| filter_4_snpe.dlc | 585 | filter_4_fc_snpe.dlc | 375 |
| filter_5_snpe.dlc | 549 | filter_5_fc_snpe.dlc | 521 |
| filter_6_snpe.dlc | 491 | filter_6_fc_snpe.dlc | 465 |
| filter_7_snpe.dlc | 621 | filter_7_fc_snpe.dlc | 445 |
| Total | 4437 | Total | 4371 |

METHOD AND APPARATUS FOR ENHANCING ILLUMINATION INTENSITY OF IMAGE

CROSS-REFERENCE TO RELATED APPLICATION

Pursuant to 35 U.S.C. § 119(a), this application claims the benefit of earlier filing date and right of priority to Korean Patent Application No. 10-2019-0139562, filed on Nov. 4, 2019, the contents of which are all hereby incorporated by reference herein in their entirety.

BACKGROUND

1. Technical Field

The present disclosure relates to a method and an apparatus for enhancing illumination intensity of an image.

2. Description of Related Art

Image processing technology is a technology for performing specific operations on an image to enhance the quality of the image or to extract specific information from the image. Image processing technology may be widely used in various fields, and is one of the core technologies required in various fields such as autonomous vehicles, security monitoring systems, video communication, and high-definition video transmission.

With the development of miniature image sensors, 5G communication networks, and artificial intelligence (AI) technology, image processing technology is also developing. Recently, cameras are being installed in various electronic devices such as laptops, smartphones, TVs, vacuum cleaners, and refrigerators. Image processing technology is being developed to utilize images captured in various environments.

In addition, as AI technology, which has been rapidly developing recently, has come to be utilized in image processing technology, research is being conducted on technology for converting a low resolution image into a high resolution image, or converting a low illumination intensity image captured in a dark place into a high illumination intensity image, by using a neural network model.

In the application of a neural network model to image processing technology for enhancing image quality, there is a continuous demand for methods capable of achieving both greater efficiency and high performance.

The above-described technology is technical information that the inventors hold for the derivation of the present disclosure or that the inventors acquired in the process of deriving the present disclosure. Thus, the above-described technology cannot be regarded as known technology disclosed to the general public prior to the filing of the present application.

SUMMARY OF THE INVENTION

Embodiments presented herein are directed to addressing the shortcomings associated with some related art in which, when using a plurality of neural networks for different functions, a convolution field should exist for each neural network, even though the convolution field for each neural network performs a similar function.

Embodiments presented herein are further directed to addressing the shortcomings associated with some related art in which, since convolution fields performing similar functions exist for each neural network, the training time of the neural network is increased.

Embodiments presented herein are still further directed to addressing the shortcomings associated with some related art in which, since convolution fields performing similar functions exist for each neural network, processing time and processing resources are increased when the neural network is applied.

Embodiments presented herein are still further directed to addressing the shortcomings associated with some related art in which memory occupancy and network loading time increase when processing an image using a plurality of neural networks having overlapping functional fields.

Embodiments presented herein are still further directed to addressing the shortcomings associated with some related art in which, when applying image processing technology to a high resolution image itself, excessive image processing time and processing resources are used due to the large size of the high resolution image.

One embodiment of the present disclosure may provide an image quality enhancing apparatus and a method for shortening processing time and lowering memory occupancy during processing, by designing a neural network such that an area for selecting a filter to be applied to enhance an image quality and an area for optimizing a parameter for the filter to enhance the image quality utilize input values from a common image feature extraction area.

One embodiment of the present disclosure may provide an apparatus and a method for extracting features of a low illumination intensity image by a common convolution field, selecting a filter configured to enhance illumination intensity of an image by a first fully connected (FC) layer using the extracted features, optimizing a parameter for the filter configured to enhance illumination intensity of the image by a second FC layer using the extracted features, and applying the optimized filter to the low illumination intensity image to output a high illumination intensity image.

One embodiment of the present disclosure may provide an apparatus and a method for resizing a low illumination intensity high resolution image to a low resolution image, applying a neural network model for high illumination intensity conversion to the resized image to determine a filter application scheme for high resolution conversion of the image, and converting the low illumination intensity high resolution image into a high illumination intensity high resolution image based on the determined filter application scheme.

A method for enhancing illumination intensity of an image according to an embodiment of the present disclosure may include receiving an image, determining a filter application scheme to enhance the illumination intensity of the received image by using a neural network model trained to enhance the illumination intensity of the image, and outputting an image having enhanced illumination intensity by applying the determined filter application scheme.

Here, the filter application scheme may include types of a plurality of filters to be applied to enhance illumination intensity of the image, an optimal parameter for each filter, and an application order of the plurality of filters, and the outputting may include applying the plurality of filters having the optimal parameter to the received image according to the application order.

In addition, the neural network model trained to enhance the illumination intensity of the image may include a first group of layers configured to extract feature information of the image, a second group of layers configured to determine the type of filter to be applied to enhance the illumination intensity based on the extracted feature information, and a third group of layers configured to determine the optimal parameter for the filter of the type determined to enhance the illumination intensity based on the extracted feature information.

In addition, the first group of layers may include a convolution layer and a pooling layer, the second group of layers may include a fully connected (FC) layer configured to determine at least one of the plurality of filters, and the third group of layers may include a fully connected (FC) layer configured to determine the optimal parameter for the determined filter, wherein an output of the first group of layers may be inputted to both the second group of layers and the third group of layers.

In addition, the third group of layers may be designed to determine the optimal parameter for the filter determined by the output of the second group of layers, by using the output of the first group of layers.

The method for enhancing illumination intensity of an image according to an embodiment of the present disclosure may further include resizing the image to a low resolution image between the receiving the image and the determining the filter application scheme, wherein the filter used in the neural network model may be a filter independent of image resolution.

In the method for enhancing illumination intensity of an image according to an embodiment of the present disclosure, the determining the filter application scheme may include: determining a first filter to be applied to enhance the illumination intensity of the image and the optimal parameter for the first filter by using a neural network model; applying the first filter having the optimal parameter to a low resolution image; determining a second filter to be applied to enhance the illumination intensity of the image and the optimal parameter for the second filter by using the neural network model based on an image outputted from applying the first filter; and applying a second filter having the optimal parameter to the image outputted from applying the first filter.

Here, the neural network model is a generative model trained based on a generative adversarial network model including a generator and a discriminator. The generative adversarial network model may be trained using original high illumination intensity images inputted to the discriminator and fake high illumination intensity images generated by the generator.

In a computer readable recording medium having recorded thereon a program for enhancing illumination intensity of an image according to another embodiment of the present disclosure, the program may include: code for receiving an image; code for determining a filter application scheme for enhancing the illumination intensity of the received image by using a neural network model trained to enhance the illumination intensity of the image; and code for outputting an image having enhanced illumination intensity by applying the determined filter application scheme to the image.

Here, the neural network model may include a first group of layers configured to extract feature information of the image, a second group of layers configured to determine a type of filter to be applied to enhance the illumination intensity based on the extracted feature information, and a third group of layers configured to determine an optimal parameter for a filter of the type determined to enhance the illumination intensity based on the extracted feature information.

An apparatus configured to enhance illumination intensity of an image according to another embodiment of the present invention may include: one or more processors; and a memory connected to the one or more processors, wherein the memory may store instructions that, when executed by the processor, cause the processor to receive an image, determine a filter application scheme to enhance the illumination intensity of the image by using a neural network model trained to enhance the illumination intensity of the received image, and output an image having enhanced illumination intensity by applying the determined filter application scheme to the image.

Here, the neural network model may include a first group of layers configured to extract feature information of the image, a second group of layers configured to determine a type of filter to be applied to enhance the illumination intensity based on the extracted feature information, and a third group of layers configured to determine an optimal parameter for the filter of the type determined to enhance the illumination intensity based on the extracted feature information.

Other aspects and features than those described above will become apparent from the following drawings, claims, and detailed description of the present disclosure.

A method and an apparatus configured to enhance illumination intensity of an image according to embodiments of the present disclosure enable image quality to be enhanced in the most effective manner by designing an efficient image processing neural network model.

In addition, a method and an apparatus configured to enhance illumination intensity of an image according to embodiments of the present disclosure may make the training of a neural network more efficient, since each of the fields performing a plurality of functions utilizes the neural network designed to utilize image features outputted from one common convolution field.

In addition, a method and an apparatus configured to enhance illumination intensity of an image according to embodiments of the present disclosure may shorten processing time and lower memory occupancy during processing, by extracting features of the image using one convolution field and by determining an optimized filter using the extracted features of the image in a filter selection field and a filter parameter optimization field.

In addition, in determining a processing scheme for enhancing illumination intensity of a high resolution image, embodiments of the present disclosure may determine a processing method for enhancing image quality in a more efficient manner by using a filter independent of resolution and utilizing a low resolution image corresponding to the high resolution image.

The effects of the present disclosure are not limited to those mentioned above, and other effects not mentioned may be clearly understood by those skilled in the art from the description below.

BRIEF DESCRIPTION OF DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without FIG. 1 is an exemplary diagram of an environment for performing a method for enhancing image quality according to an embodiment of the present disclosure.

FIG. 2 illustrates a system configured to train a neural network configured to enhance illumination intensity of an image according to an embodiment of the present disclosure.

FIG. 3 is a diagram illustrating a neural network configured to enhance illumination intensity of an image according to an embodiment of the present disclosure.

FIG. 4 is a diagram illustrating a neural network configured to enhance illumination intensity of an image according to another embodiment of the present disclosure.

FIG. 5 is a diagram illustrating a neural network configured to enhance illumination intensity of an image according to still another embodiment of the present disclosure.

FIG. 6 illustrates a structure of an exemplary neural network configured to enhance illumination intensity of an image according to an embodiment of the present disclosure.

FIG. 7 illustrates a structure of an exemplary neural network configured to enhance illumination intensity of an image according to another embodiment of the present disclosure.

FIG. 8 is a flowchart illustrating a method for enhancing illumination intensity of an image according to an embodiment of the present disclosure.

FIG. 9 illustrates an example of a filter that may be used to enhance illumination intensity of an image according to an embodiment of the present disclosure.

FIG. 10 is a table showing a comparison between network sizes used in an image illumination intensity enhancing scheme according to an embodiment of the present disclosure and network sizes used in an image illumination intensity enhancing scheme in the related art.

FIG. 11 is a table showing a comparison between network loading time used in an image illumination intensity enhancing scheme according to an embodiment of the present disclosure and network loading time used in an image illumination intensity enhancing scheme in the related art.

DETAILED DESCRIPTION

The advantages and features of the present disclosure and ways to achieve them will be apparent by making reference to embodiments as described below in detail in conjunction with the accompanying drawings. However, it should be construed that the present disclosure is not limited to the embodiments disclosed below but may be implemented in various different forms, and covers all the modifications, equivalents, and substitutions belonging to the spirit and technical scope of the present disclosure. The embodiments disclosed below are provided so that this disclosure will be thorough and complete and will fully convey the scope of the present disclosure to those skilled in the art. Further, in the following description of the present disclosure, a detailed description of known technologies incorporated herein will be omitted when it may make the subject matter of the present disclosure rather unclear.

The terms used in this application is for the purpose of describing particular embodiments only and is not intended to limit the disclosure. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms may be used herein only to describe various elements, but these elements should not be limited by these terms. Furthermore, these terms such as "first," "second," and other numerical terms, are used only to distinguish one element from another element.

Hereinafter, embodiments of the present disclosure will be described in detail with reference to the accompanying drawings. Like reference numerals designate like elements throughout the specification, and overlapping descriptions of the elements will be omitted.

FIG. 1 is an exemplary diagram of an environment for performing a method for enhancing image quality according to an embodiment of the present disclosure.

The environment for performing a method for enhancing an image quality according to an embodiment of the present disclosure may include a user terminal 100, a server computing system 200, a training computing system 300, and a network 400 that enables the user terminal 100, the server computing system 200, and the training computing system 300 to communicate with each other.

The user terminal 100 may support object-to-object intelligent communication such as Internet of Things (IoT), Internet of Everything (IoE), and Internet of Small Things (IoST), and may also support communication such as machine to machine (M2M) communication and device to device (D2D) communication.

The user terminal 100 may determine an image resolution enhancing scheme using big data, AI algorithms, and/or machine learning algorithms in a 5G environment connected for the Internet of things (IoT).

The user terminal 100 may be, for example, any kind of computing device, such as a personal computer, a smartphone, a tablet, a game console, and a wearable device. The user terminal 100 may include one or more processors 110 and a memory 120.

The one or more processors 110 may include any type of device capable of processing data, such as an MCU. Here, the 'processor' may refer to, for example, a data processing device embedded in hardware, which includes physically structured circuits in order to perform functions represented as a code or command contained in a program.

Examples of the data processing device embedded in hardware may include processing devices, such as a microprocessor, a central processing unit (CPU), a processor core, a multiprocessor, an application-specific integrated circuit (ASIC), a field programmable gate array (FPGA), a graphics processing unit (GPU), and a neural network processing unit (NPU), but the scope of the present disclosure is not limited thereto.

The memory 120 may include one or more non-transitory storage media such as RAM, ROM, EEPROM, EPROM, flash memory devices, and magnetic disks. The memory 120 may store data 122 and instructions 124 that, when executed by processors 110, cause the user terminal 100 to perform operations.

In addition, the user terminal 100 may include a user interface 140 to receive instructions from a user and to transmit output information to the user. The user interface 140 may include various input means such as a keyboard, a mouse, a touch screen, a microphone, and a camera, and various output means such as a monitor, a speaker, and a display.

The user may select an image or an area of the image area to be processed in the user terminal 100 by means of the user interface 140. For example, the user may select, in the image, an object or an area for which the illumination intensity is desired to be enhanced by means of the mouse, the keyboard, the touch screen, or the like. In addition, the user may generate a command to reduce or enlarge the image by performing a pinch-in or pinch-out operation on the touch screen.

In one embodiment, the user terminal 100 may also store or include an image processing model 130 to which AI technology is applied. For example, the image processing model 130 to which AI technology is applied may be various learning models, such as a convolution neural network, a generative adversarial network, or other types of machine learning models.

Here, AI is an area of computer engineering science and information technology that studies methods to make computers mimic intelligent human behaviors such as reasoning, learning, self-improving, and the like.

Also, AI does not exist on its own, but is rather directly or indirectly related to a number of other fields in computer science. Particularly in recent years, there have been numerous attempts to introduce an element of AI into various fields of information technology to solve problems of the respective fields.

Machine learning is an area of artificial intelligence that includes the field of study that gives computers the capability to learn without being explicitly programmed.

Specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds a specific model for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth. Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network (ANN)' and 'neural network' may be used interchangeably herein.

ANN may include a number of layers, each including a number of neurons. Furthermore, ANN may include synapses that connect the neurons to one another.

ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer. The hidden layer receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network including a plurality of hidden layers between the input layer and the output layer may be a representative artificial neural network that implements deep learning, which is a type of machine learning technology.

An ANN may be trained using training data. Here, the training may refer to the process of determining parameters of the artificial neural network by using the training data, to perform tasks such as classification, regression analysis, and clustering of inputted data. As a representative example of the parameter for the artificial neural network, there can be a weight given to a synapse or a bias applied to a neuron.

An ANN trained using training data can classify or cluster inputted data according to a pattern within the inputted data.

Throughout the present specification, an ANN trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regression, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

Meanwhile, the training data represents a plurality of features, and training data being labeled with the labels can mean that the feature represented by the training data is labeled. In this case, the training data can represent the feature of an input object in the form of a vector.

Using training data and labeling data together, the artificial neural network may derive a correlation function between the training data and the labeling data. Then, through evaluation of the function derived from the artificial neural network, a parameter for the artificial neural network may be determined (optimized).

Unsupervised learning is a machine learning method that learns from training data that has not been given a label.

More specifically, unsupervised learning may be a training method that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether input data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An autoencoder is a neural network which aims to reconstruct its input as output.

More specifically, the autoencoder may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is a machine learning method that makes use of both labeled training data and unlabeled training data.

One semi-supervised learning technique involves guessing the label of unlabeled training data, and then using this guessed label for learning. This technique may be used advantageously when the cost associated with the labeling process is high.

Reinforcement learning may be based on a theory that given the condition under which a reinforcement learning agent can determine what action to choose at each time instance, the agent can find the optimal path to a solution solely based on experience without reference to data.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving the optimal policy.

An ANN is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining the optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The image processing models 130 to which AI technology as described above is applied may be first created via a training step by the training computing system 300, and may be stored in the server computing system 200, and then transmitted to the user terminal 100 through the network 400.

The image processing model 130 may be a neural network for image processing, and may be a training model trained to process a low illumination intensity image to output a high illumination intensity image when the low illumination intensity image is inputted. Here, the training may be performed using a generative adversarial network model, reinforcement learning, or the like.

Typically, the image processing model 130 may be subjected to the training step in the training computing system 300, and then stored in the user terminal 100 in a state that can be applied to the low illumination intensity image. Alternatively, in some embodiments, the image processing model 130 may be updated or upgraded by additional training in the user terminal 100.

Meanwhile, the image processing model 130 stored in the user terminal 100 may be some of the image processing models generated in the training computing system 300, and if necessary, new image processing models may be generated by the training computing system 300 and transferred to the user terminal 100.

As another example, the image processing models may be stored in the server computing system 200 instead of being stored in the user terminal 100, and may provide necessary functions to the user terminal 100 in the form of a web service.

The server computing system 200 may include processors 210 and a memory 220, and may generally have greater processing capability and larger memory capacity than the user terminal 100. Accordingly, according to the system implementation, a heavy image processing model 230 that requires greater processing capability for the application may be stored in the server computing system 200, and a lightweight image processing model 130 that requires less processing capability for the application may be stored in the user terminal 100.

The user terminal 100 may select an appropriate image processing model from among various image processing models according to an attribute of an image to be processed. In one example, when a lightweight image processing model 130 is required, the user terminal 100 may use the image processing model 130 stored in the user terminal 100, and when a heavy image processing model 230 is required, the user terminal 100 may use the image processing model 230 stored in the server computing system 200.

The image processing models 130 and 230 included in the user terminal 100 or the server computing system 200 may be an image processing neural network generated by a training computing system 300.

The training computing system 300 may include one or more processors 310 and a memory 320. In addition, the training computing system 300 may include a model trainer 350 and training data 360 to train machine learning models.

The training computing system 300 may generate a plurality of image processing models based on the training data 360 by means of the model trainer 350.

The image processing neural network model generated by the training operation system 300 according to an embodiment of the present disclosure may be used for various image quality enhancements, such as image resolution enhancement and image illumination intensity enhancement. Hereinafter, the image processing neural network will be described in relation to an example for enhancing illumination intensity of the image.

FIG. 2 illustrates a system configured to train a neural network configured to enhance illumination intensity of an image according to an embodiment of the present disclosure.

As illustrated in FIG. 2, the image processing neural network model according to an embodiment of the present disclosure may be generated by means of a generative adversarial network (GAN). The GAN is a representative model of unsupervised learning, and includes a generator 510 configured to generate fake data that is as similar as possible to real data, and a discriminator 560 configured to discriminate between the real data and the fake data generated by the generator 510. The GAN is trained through adversarial learning between the generator 510 and the discriminator 560.

In adversarial learning, the process of first training the discriminator 560, then training the generator 510, then training the discriminator 560 again, and then training the constructor 510 again is repeated.

The discriminator 560 receives real data, and fake data generated by the generator 510, and then discriminates whether the received data is real data or fake data. The discriminator 560 feeds the discrimination result back to the generator 510 to train the generator 510 to generate more sophisticated fake data.

As the training is repeated, the generator 510 becomes able to generate fake data that is difficult to distinguish from real data, and eventually, the discriminator 560 has a 50% probability of determining the authenticity of the data. The learning ends at this stage.

In an environment for training a neural network to enhance illumination intensity of the image according to an embodiment of the present disclosure, raw images 501, for example, low illumination intensity images, and processed images 505, for example, high illumination intensity images, may be prepared. Here, the raw images 501 and the processed images 505 need not correspond to each other.

Some of the unprocessed images 505 are inputted to the discriminator 560 as a real sample 550, and the discriminator 560 may be trained to determine a real image (in this embodiment, a high illumination intensity image) on which the intended processing has been performed.

The generator 510 may include an actor 520 including $\pi 1$ 523, which is a policy for filter parameter selection, and $\pi 2$ 525, which is a policy for filter selection. $\pi 1$ 523 may perform a function of selecting a parameter for a filter configured to perform the optimal conversion, and $\pi 2$ 525 may perform a function of selecting the type of filter configured to convert an input image.

The discriminator 560 may be trained to determine a fake image by using a dummy sample 540 first generated by the generator 510. A critic 530 of the generator 510 provides a reward with respect to the filter selection and the parameter selection by the actor 520 based on feedback from the discriminator 560, and the actor 520 changes the filter and parameter selections such that the discriminator 560 may not determine that the dummy sample is not real. This process may be performed according to the reinforcement learning process. Through this process, the generator 510 is trained to generate dummy images close to the processed images 505, which are high illumination intensity images.

The discriminator 560 learns via the dummy sample 540 inputted by the generator 510 and is thereby trained to better distinguish the dummy image from the real image (the high illumination intensity image), and the generator 510 receives feedback from the discriminator 560 and may thereby be trained to generate a dummy image that is more similar to the real image (the high illumination intensity image).

By repeating this process, the actor 520 of the generator 510 may be trained to be a neural network model having optimal filters and the optimal parameters for converting low illumination intensity images to high illumination intensity images.

FIG. 3 is a diagram illustrating a neural network configured to enhance illumination intensity of an image according to an embodiment of the present disclosure.

Referring to the actor 520 in more detail, $\pi 1$ 523 may be a function for determining which parameter to select for eight filters depending on an input image 501, for example. In addition, $\pi 2$ 525 may be a function for determining which filter to be applied depending on the input image 501.

In the design as shown in FIG. 3, all eight filter extractors may be operated according to the $\pi 1$ 523 so that images filtered with eight filters to which filter parameters are respectively applied are first obtained. Thereafter, an action extractor may be operated to select which of the eight filters to use, and may then select one of the eight filtered images and output the selected image in the form of, for example, one hot vector of (1, 8).

In the above description, eight types of filters are illustrated, but the number of types is not limited thereto. Also, the action selected by the action extractor may be related to sequential application of a plurality of filters instead of one filter.

Through the above process, the input image 501 having low illumination intensity may be converted into an output image 507 having high illumination intensity by the actor 520.

Meanwhile, in the design as shown in FIG. 3, since parameter selection corresponding to the number of filters according to the types of filters to be applied should be performed, seven filtered images, which will not be used as output images, may be wasted.

FIG. 4 is a diagram illustrating a neural network configured to enhance illumination intensity of an image according to another embodiment of the present disclosure.

An image processing sequence as shown in FIG. 4 is the reverse of the image processing sequence as shown in FIG. 3. That is, an action extractor 623 is first operated to determine the type of filter to be applied, and then a filter extractor 625 is operated to determine the parameter for the filter.

Accordingly, for example, one of eight filters may be first selected based on the input image 601, and only one selected filter may be loaded and the optimal filter parameter value thereof inferred, and the inferred parameter value may be applied to the selected filter to produce an output image having high illumination intensity.

In the design as shown in FIG. 4, the action extractor 623 is first operated to determine a filter to be applied, and then the parameter value for the filter to be applied is inferred. Accordingly, image processing may be performed more efficiently.

Meanwhile, although eight types of filters are illustrated in FIG. 4, the number of the types is not limited thereto. In addition, the action selected by the action extractor 623 may be related to sequential application of a plurality of filters instead of one filter, and the filter extractor 625 may infer the optimal parameter value for each of the selected filters.

Since the action extractor 623 and the filter extractor 625 of FIG. 4 may select the optimal type of filter and a filter parameter depending on the input image, each of the action extractor 623 and the filter extractor 625 may include a convolution layer for extracting features of the input image.

In an embodiment of the present disclosure, since a network size for the action extractor 623 is about 4.9 MB and a network size for the filter extractor 625 is about 4.9 MB, the total network size of the image processing neural network model is about 9.8 MB.

Hereinafter, a design is disclosed in which, in order to process images more efficiently, two functions may commonly use a convolution field that performs a common function.

FIG. 5 is a diagram illustrating a neural network configured to enhance illumination intensity of an image according to still another embodiment of the present disclosure.

In FIG. 5, there is a separate convolution layer 721 configured to extract image features required by an action extractor and a filter extractor. The convolution layer 721 may receive an input image 701 having low illumination intensity, extract an image feature, and transfer the extracted image feature to an action extractor fully connected (FC) layer 723.

The action extractor FC layer 723 may select the type of filter to be applied using the image feature extracted by the convolution layer 721. The filter extractor FC layer 725 may infer the optimal parameter value of the filter to be applied using the image feature extracted by the convolution layer 721.

A filter having the optimal parameter value inferred through the above process may be applied to the input image 701 having low illumination intensity to obtain an output image 707 having high illumination intensity.

In an embodiment of the present disclosure, a network size for the convolution layer 721 is about 2.8 MB, a network size for the action extractor FC layer 723 is about 2.1 MB, and a network size for the filter extractor FC layer 725 is about 2.1 MB. Thus, the total network size of the image processing neural network model according to an embodiment of the present disclosure is about 7 MB.

That is, since the convolution layer that existed in both the action extractor and the filter extractor may be separated from the action extractor and the filter extractor, and the action extractor and the filter extractor may share the result of the convolution layer, the total network size may be reduced.

Accordingly, it is possible to save loading time, processing time, and processing resources of the image processing neural network model used to convert a low illumination intensity image into a high illumination intensity image.

FIG. 6 illustrates a structure of an exemplary neural network configured to enhance illumination intensity of an image according to another embodiment of the present disclosure.

When a high resolution low illumination image is inputted to the image processing neural network model, processing speed may be slow and excessive processing resources may be required, due to the large size of the image.

Meanwhile, the filters used in the image processing neural network model may be independent of resolution. That is, the resolution of the image is irrelevant to inferring the type of the optimal filter and the optimal parameter for the filter to enhance the illumination intensity of the input image.

Therefore, in order to increase the processing efficiency, the inputted high resolution low illumination intensity image is resized to a low resolution low illumination intensity image, which in turn is used to infer the type of the optimal filter and the optimal parameter for the filter to be used for enhancing the illumination intensity.

The low resolution low illumination intensity image may be inputted to an action extractor 823 and a filter extractor 825. The action extractor 823 may include, in the front portion, a convolution layer and a pooling layer configured to extract the feature of the image, and in the back portion, an FC layer configured to select a filter using the image feature.

The action extractor 823 may select a filter, for example, one of eight filters, configured to enhance the illumination intensity of the input image, and the selected filter may be loaded.

The filter extractor 825 may also include, in the front portion, a convolution layer and a pooling layer configured to extract the feature of the image, and in the back portion, an FC layer configured to select a filter parameter using the image feature.

When the optimal parameter is inferred by the filter extractor 825, the filter determined by the action extractor 823 may be applied to the high resolution low illumination intensity image to enhance the illumination intensity, using the parameter inferred by the filter extractor 825.

Through the above-described process, a high resolution high illumination intensity image may be generated from the high resolution low illumination intensity image.

In the image processing neural network model as shown in FIG. 6, since both the action extractor 823 and the filter extractor 825 include the convolution layer configured to extract image features, the image processing neural network model has a relatively large network size, as in the embodiment of FIG. 4.

FIG. 7 illustrates a structure of an exemplary neural network configured to enhance illumination intensity of an image according to still another embodiment of the present disclosure.

In FIG. 7, similar to FIG. 6, the high resolution low illumination intensity image may be resized to a low resolution low illumination intensity image, and the resized low resolution low illumination intensity image is inputted to the image processing neural network model.

In FIG. 7, unlike the image neural network of FIG. 6, a convolution layer 721 configured to extract the feature of the image is separately present in the front portion of the neural network, and the convolution layer 721 may extract the feature of the input image. Here, the convolution layer 721 may include a plurality of convolution layers and pooling layers, and may be referred to as a first group of layers.

The action extractor FC layer 723 may determine the type of filter to be applied based on the image feature extracted by the first group of layers. The action extractor FC layer 723 may include a plurality of FC layers, and may be referred to as a second group of layers.

The filter extractor FC layer 725 may determine the optimal parameter for the filter of the type determined based on the image feature extracted by the first group of layers. That is, the filter extractor FC layer 725 may be designed to determine the optimal parameter for the filter determined by the action extractor FC layer 723 based on the output of the convolution layer 721.

As shown in FIG. 7, the filter extractor FC layer 725 may include a plurality of FC layers, and may be referred to as a third group of layers.

Meanwhile, in the training phase of the image processing neural network of the design as shown in FIG. 7, the common convolution layer 721 may be trained such that the image features extracted by the common convolution layer 721 may be used in both the actor extractor FC layer 723 and the filter extractor FC layer 725.

A processor of the image illumination intensity enhancing apparatus may apply, to the low resolution low illumination intensity image, the selected filter with the optimal parameter determined through the above-described process. The low resolution image of which illumination intensity is enhanced by applying the filter may be inputted again to the neural network model configured to enhance illumination intensity of the image, and thus, in order to further enhance the illumination intensity, the filter to be applied may be additionally selected and the optimal parameter may be additionally inferred.

As the above process is repeated, a filter application scheme including types of filters, the optimal parameter for each filter, and an application order of a plurality of filters may be determined.

Here, the types of filters may include, but are not limited to, an exposure filter, a gamma filter, a color curve filter, a black and white filter, a white balance filter, a saturation filter, or a tone curve filter.

In addition, the types of filters may further include a noise reduction filter, which is an important factor for enhancing a low illumination intensity image, and a sharpness filter configured to reduce a watercolor phenomenon that may appear as a side effect of the noise reduction filter.

According to the filter application scheme determined through the above-described process, a filter may be applied to the input image to output an image with enhanced illumination intensity.

FIG. 8 is a flowchart illustrating a method for enhancing illumination intensity of an image according to another embodiment of the present disclosure.

In step S100, a high resolution low illumination intensity image may be inputted to an image illumination intensity enhancing device. The image illumination intensity enhancing device may include one or more processors and a memory connected to the processors, and the memory may store an image processing neural network model.

In step S200, the processor of the image illumination intensity enhancing device may convert the inputted high resolution image into a low resolution image through a resizing process. The image processing neural network model may be applied to the low resolution image.

The image processing neural network model may be designed as shown in FIG. 7 as a neural network model trained to enhance the illumination intensity of the image. The image processing neural network model may include a convolution layer 721 configured to extract an image feature, a first FC layer 723 configured to select a filter to be applied based on the extracted image feature, and a second FC layer 725 configured to infer the optimal parameter for the filter selected based on the extracted image feature.

By using the image processing neural network model, a filter application scheme for enhancing the illumination intensity of the input image may be determined as follows.

In step S300, one or more processors may apply the convolution layer 721 to the low resolution image to extract image features. The extracted image features may be transferred to the first FC layer 723 designed to select a filter configured to enhance the illumination intensity of the image. In step S400, the processor of the image illumination intensity enhancing device may select a filter to be applied, by using the first FC layer 723 based on the extracted image features.

In addition, the extracted image features may be transferred to a second FC layer 725 designed to infer the optimal parameter for the selected filter. In step S500, the processor of the image illumination intensity enhancing device may infer the optimal parameter for the filter selected by the second FC layer 725 based on the extracted image features.

In step S600, the processor of the image illumination intensity enhancing device may determine a filter having the optimal parameter to enhance the illumination intensity of the low illumination intensity image based on the results outputted from the steps S400 and S500.

In the above description, only one filter is determined and the optimal parameter for the determined filter is inferred. However, by repeating the processes as mentioned above, a filter application scheme for applying a plurality of optimized filters may be determined.

In this case, the filter application scheme may include types of filters to be applied for enhancing the illumination intensity of the image, the optimal parameter for each filter, and an application order of a plurality of filters.

In step S700, the processor of the image illumination intensity enhancing device may apply the determined filter to a high resolution low illumination intensity image that is initially inputted. In step S800, the low illumination intensity image to which the filter is applied may be outputted as an image having enhanced illumination intensity.

In the above description, the filter application scheme has been described as determining only one filter and the optimal parameter for the filter, and then applying the filter to the image. However, the filter application scheme may include the type of filter, the optimal parameter for each of the plurality of filters, an application order of the plurality of filters, and the like.

FIG. 9 illustrates an example of a filter that may be used to enhance illumination intensity of an image according to an embodiment of the present disclosure.

The image illumination enhancing device may apply a specific filter to the input image to convert the input image, and use an appropriate filter to effectively enhance the illumination intensity of the image.

In this regard, the action extractor FC layer 723, which may be referred to as the second group of layers, may be designed to determine at least one of an exposure filter, a gamma filter, a color curve filter, a black and white filter, a white balance filter, a saturation filter, a tone curve filter, or a contrast filter to enhance the illumination intensity of the image based on the feature of the input image.

The types of filters that may be determined are more diverse than those mentioned above. Especially, the types of filters may further include a noise reduction filter, which is an important factor for enhancing a low illumination intensity image, and a sharpness filter configured to reduce a watercolor phenomenon that may appear as a side effect of the noise reduction filters.

Each filter may have a specific effect on the image, and the degree of the effect on the image may vary depending on the selected parameter. In order to enhance the illumination intensity of the input image, it is required to appropriately determine not only the type of filter to be applied but also the parameter value for the filter.

The filter extractor FC layer 725, which may be referred to as the third group of layers, may be designed to infer the optimal filter parameter to enhance the illumination intensity of the input image based on the features of the input image.

FIG. 9 shows how an input image is converted when parameters are determined for some of the filters and the corresponding filters having the determined parameters are applied. In addition, FIG. 9 shows a gradient of an output image, and the gradient may be further utilized for image processing.

FIG. 10 is a table showing a comparison between network sizes used in an image illumination intensity enhancing scheme according to an embodiment of the present disclosure and network sizes used in an image illumination intensity enhancing scheme in the related art.

The value in the second column from the left end in the table of FIG. 10 indicates a network size for each type of filter in the action extractor and the filter extractor when the action extractor and the filter extractor each have a convolution field.

The value in the last column in the table of FIG. 10 indicates a network size of the convolution field, a network size of the action extractor, and a network size for each type of filter in the filter extractor when the convolution field is shared.

As shown in FIG. 10, according to the design in which the convolution filed is not shared, the action extractor requires a network size of 4.9 MB, and each filter extractor requires a network size of 4.9 MB. As a result, when there are eight types of filters, the total network size of 44.1 MB is required.

By contrast, when the convolution field is shared, the convolution field requires a network size of 2.8 MB, the action extractor requires a network size of 2.1 MB, and each filter extractor requires a network size of 2.1 MB. As a result, when there are eight types of filters, the total network size of 21.7 MB is required.

According to the comparison above, the total network size is reduced when the convolution field is designed to be shared.

FIG. 11 is a table showing a comparison between network loading time used in an image illumination intensity enhancing scheme according to an embodiment of the present disclosure and network loading time used in an image illumination intensity enhancing scheme in the related art.

The value in the second column from the left end in the table of FIG. 11 indicates network loading time for each type of filter in the action extractor and the filter extractor when the action extractor and the filter extractor each have a convolution field.

The value in the last column in the table of FIG. 11 indicates network loading time of the convolution field, network loading time of the action extractor, and network loading time for each type of filter in the filter extractor when the convolution field is shared.

As shown in FIG. 11, according to the design in which the convolution filed is not shared, the action extractor requires a network loading time of 384 ms, and each filter extractor requires a network loading time of 411~621 ms. As a result, when there are eight types of filters, the total network loading time of 4437 ms is required.

By contrast, when the convolution field is shared, the convolution field requires a network loading time of 446 ms, the action extractor requires a network loading time of 409 ms, and each filter extractor requires a network loading time of 364~521 ms. As a result, when there are eight types of filters, a total network loading time of 4371 ms is required.

According to the comparison above, the total network loading time is also reduced when the convolution field is designed to be shared.

As described above, when the convolution field is shared in the image processing neural network model, network size may be saved and network loading time may be reduced, so that the image may be processed more efficiently.

Embodiments according to the present disclosure described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer program may be one specially designed and configured for the present disclosure, or may be one well known and available in the technical fields of computer software. Examples of program code include both machine codes, such as those produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

What is claimed is:

1. A method for enhancing illumination intensity of an image, the method comprising:

receiving an image;

determining a filter application scheme to enhance the illumination intensity of the received image by using a neural network model trained to enhance the illumination intensity of the image; and outputting an image having enhanced illumination intensity by applying the determined filter application scheme to the received image, wherein the neural network model comprises a first group of layers configured to extract feature information of the image, a second group of layers configured to determine a type of filter to be applied to enhance the illumination intensity based on the extracted feature information, and a third group of layers configured to determine an optimal parameter for the filter determined at the second group of layers to enhance the illumination intensity based on the extracted feature information.

2. The method according to claim 1, further comprising, between the receiving the image and the determining the filter application scheme, resizing the image to a low resolution image, wherein the filter used in the neural network model is a filter independent of image resolution.

3. The method according to claim 2, wherein the determining the filter application scheme comprises:

determining, by using the neural network model, a first filter to be applied to enhance the illumination intensity of the image and the optimal parameter for the first filter;

applying the first filter having the optimal parameter to the low resolution image;

determining a second filter to be applied to enhance the illumination intensity of the image and the optimal parameter for the second filter, by using the neural network model based on an output image outputted from the applying the first filter; and applying the second filter having the optimal parameter to the output image outputted from the applying the first filter.

4. The method according to claim 1, wherein the neural network model is a generative model trained based on a generative adversarial network model comprising a generator and a discriminator, and the generative adversarial network model is trained using original high illumination intensity images inputted to the discriminator and fake high illumination intensity images generated by the generator.

5. The method according to claim 1, wherein the first group of layers comprises a convolution layer and a pooling layer, the second group of layers comprises a fully connected (FC) layer configured to determine at least one of a plurality of filters, and the third group of layers comprises a fully connected (FC) layer configured to determine the optimal parameter for the determined filter, and wherein an output of the first group of layers is inputted to both the second group of layers and the third group of layers.

6. The method according to claim 5, wherein the third group of layers is designed to determine the optimal parameter for the filter determined by the output of the second group of layers, by using the output of the first group of layers.

7. The method according to claim 1, wherein the second group of layers is designed to determine at least one of an exposure filter, a gamma filter, a color curve filter, a black and white filter, a white balance filter, a saturation filter, a tone curve filter, or a contrast filter.

8. The method according to claim 1, wherein the filter application scheme comprises a type of filter to be applied to enhance the illumination intensity of the image, the optimal parameter for each filter, and an application order of a plurality of filters.

9. The method according to claim 8, wherein the outputting comprises sequentially applying, to the image, the plurality of filters having the optimal parameter according to the application order.

10. A non-transitory computer readable recording medium on which a program for enhancing illumination intensity of an image is recorded, the program comprising:
code for receiving an image;
code for determining a filter application scheme for enhancing the illumination intensity of the received image by using a neural network model trained to enhance the illumination intensity of the image; and
code for outputting an image having enhanced illumination intensity by applying the determined filter application scheme to the received image,
wherein the neural network model comprises a first group of layers configured to extract feature information of the image, a second group of layers configured to determine a type of filter to be applied to enhance the illumination intensity based on the extracted feature information, and a third group of layers configured to determine an optimal parameter for the filter determined at the second group of layers to enhance the illumination intensity based on the extracted feature information.

11. An apparatus configured to enhance illumination intensity of an image comprising:
one or more processors; and
a memory connected to the one or more processors,
wherein the memory stores instructions that, when executed by the processor, cause the processor to perform a method, the method comprising:
receiving an image;
determining a filter application scheme to enhance the illumination intensity of the received image by using a neural network model trained to enhance the illumination intensity of the image; and
outputting an image having enhanced illumination intensity by applying the determined filter application scheme to the received image,
wherein the neural network model comprises a first group of layers configured to extract feature information of the image, a second group of layers configured to determine a type of filter to be applied to enhance the illumination intensity based on the extracted feature information, and a third group of layers configured to determine an optimal parameter for the filter determined at the second group of layers to enhance the illumination intensity based on the extracted feature information.

12. The apparatus according to claim 11, wherein the memory further stores instructions that, when executed by the processor, cause the processor to perform, between the receiving the image and the determining the filter application scheme, resizing of the image to a low resolution image, and wherein the filter used in the neural network model is a filter independent of image resolution.

13. The apparatus according to claim 12, wherein the determining the filter application scheme comprises:
determining a first filter to be applied to enhance the illumination intensity of the image and the optimal parameter for the first filter by using the neural network model;
applying the first filter having the optimal parameter to the low resolution image;
determining a second filter to be applied to enhance the illumination intensity of the image and the optimal parameter for the second filter, by using the neural network model based on an output image outputted from the applying the first filter; and
applying the second filter having the optimal parameter to the output image outputted from the applying the first filter.

14. The apparatus according to claim 11, wherein the neural network model is a generative model trained based on a generative adversarial network model comprising a generator and a discriminator, and the generative adversarial network model is trained using original high illumination intensity images inputted to the discriminator and fake high illumination intensity images generated by the generator.

15. The apparatus according to claim 11, wherein the first group of layers comprises a convolution layer and a pooling layer, the second group of layers comprises a fully connected (FC) layer configured to determine at least one of a plurality of filters, and the third group of layers comprises a fully connected (FC) layer configured to determine the optimal parameter for the determined filter, and wherein an output of the first group of layers is inputted to both the second group of layers and the third group of layers.

16. The apparatus according to claim 15, wherein the third group of layers is designed to determine the optimal parameter for the filter determined by an output of the second group of layers, by using the output of the first group of layers.

17. The apparatus according to claim 11, wherein the second group of layers is designed to determine at least one of an exposure filter, a gamma filter, a color curve filter, a black and white filter, a white balance filter, a saturation filter, a tone curve filter, or a contrast filter.

18. The apparatus according to claim 11, wherein the filter application scheme comprises a type of filter to be applied to enhance the illumination intensity of the image, the optimal parameter for each filter, and an application order of a plurality of filters.

19. The apparatus according to claim 18, wherein the outputting comprises sequentially applying, to the image, the plurality of filters having the optimal parameter according to the application order.

20. The apparatus according to claim 18, wherein the plurality of filters comprise a noise reduction filter and a sharpness filter.

* * * * *